(12) United States Patent
Bonner

(10) Patent No.: US 8,521,251 B2
(45) Date of Patent: Aug. 27, 2013

(54) METHOD AND SYSTEM FOR PROVIDING A NOISE BASED SCAN CONTROL

(75) Inventor: Michael George Bonner, Wauwatosa, WI (US)

(73) Assignee: General Electric Company, Schenectady, NY (US)

( * ) Notice: Subject to any disclaimer, the term of this patent is extended or adjusted under 35 U.S.C. 154(b) by 2926 days.

(21) Appl. No.: 10/962,146

(22) Filed: Oct. 11, 2004

(65) Prior Publication Data
US 2006/0079744 A1    Apr. 13, 2006

(51) Int. Cl.
*A61B 5/05*    (2006.01)

(52) U.S. Cl.
USPC ........................................................ 600/407

(58) Field of Classification Search
USPC ........................................................ 600/407
See application file for complete search history.

(56) References Cited

U.S. PATENT DOCUMENTS

| | | | |
|---|---|---|---|
| 4,986,272 A | 1/1991 | Riederer et al. | |
| 6,337,992 B1 * | 1/2002 | Gelman | 600/425 |
| 6,429,433 B1 | 8/2002 | Gagnon et al. | |
| 6,442,495 B1 * | 8/2002 | Fleming-Dahl | 702/69 |
| 7,173,248 B2 * | 2/2007 | Ross et al. | 250/363.03 |
| 7,381,962 B2 * | 6/2008 | Goldberg | 250/370.09 |
| 2002/0191741 A1 * | 12/2002 | Brendler et al. | 378/96 |
| 2003/0063709 A1 * | 4/2003 | Lautenschlager et al. | 378/210 |
| 2003/0092991 A1 * | 5/2003 | Sehgal | 600/458 |
| 2004/0195521 A1 * | 10/2004 | Alekseev et al. | 250/423 R |
| 2004/0208276 A1 * | 10/2004 | Kaufman | 378/4 |

FOREIGN PATENT DOCUMENTS

JP    5-176911    7/1993

OTHER PUBLICATIONS

Tapiovaara, Evaluation of image quality in fluoroscopy by measurements and Monte Carlo calculations, Nov. 1994, Phys. Med. Biol., 589-607.*

* cited by examiner

*Primary Examiner* — Tse Chen
*Assistant Examiner* — Hien Nguyen
(74) *Attorney, Agent, or Firm* — The Small Patent Law Group; Dean D. Small

(57) ABSTRACT

Method and system for scanning a patient using a medical imaging system is described. The described method includes measuring a signal-to-noise ratio of an acquired data and/or reconstructed image and comparing the same with a selectable signal-to-noise ratio threshold. The method further includes controlling a remainder of the scan based on the comparison.

7 Claims, 5 Drawing Sheets

METHOD AND SYSTEM FOR PROVIDING A NOISE BASED SCAN CONTROL

BACKGROUND OF THE INVENTION

This invention relates generally to medical imaging systems, and more particularly, to providing a noise based control over the scanning time in medical imaging systems.

Some conventional positron emission tomography (PET) systems use a predetermined or fixed amount of time to acquire a scan. Other conventional PET systems determine the scan time based on the amount of activity detected. The activity detected in PET systems corresponds to the number of gamma rays detected by the PET scanners. Both the above mentioned methods, however, may not be able to predict the quality of the images. Therefore, in order to acquire an image of specific quality, an estimate of the amount of time or activity may be needed.

The time for acquiring a scan may be dependent on the desired image quality of the scan. To acquire an image of better quality, a larger scan time may be required. However, productivity may suffer due to large scan times. Furthermore, more time may be spent in scanning than necessary, in order to get an image of a specific quality. If the scan time is reduced to improve productivity, the image quality may get adversely affected. Therefore, the selection of the scan time may have to be a trade off between image quality and productivity.

PET systems need to optimize the scan time in order to get an image of predicted quality without adversely affecting the productivity.

BRIEF DESCRIPTION OF THE INVENTION

In one exemplary embodiment, a method of scanning a patient using a medical imaging system is provided. The method includes measuring a signal-to-noise ratio of an accumulated acquired data and/or reconstructed image corresponding to a scan and comparing this signal-to-noise ratio with a selectable signal-to-noise ratio threshold. Remainder of the scan is controlled based on the comparison.

In another exemplary embodiment, a medical imaging system is provided. The medical imaging system includes a gantry, a patient table and a computer system. The gantry includes a detector that can be rotated about its axis, called as the viewing area axis. A patient to be scanned is placed on the patient table, which can be moved along the viewing area axis. A computer system is configured to control the operation of the medical imaging system. The computer system is programmed to position the patient table at a plurality of axial positions, to receive acquired data for each frame of acquired data during a short scan and to terminate a scan if the signal-to-noise ratio of the acquired data and/or reconstructed image is greater than or equal to a selectable signal-to-noise ratio threshold. Each axial position corresponds to a frame of acquired data.

DETAILED DESCRIPTION OF THE INVENTION

Various embodiments of the invention provide a method and system for controlling the scan time of a PET system based on the noise in the acquired data. The embodiments utilize signal-to-noise ratio (SNR) to predict the quality of the image and in turn control the scan time based on the SNR of the acquired data.

Figure 1:
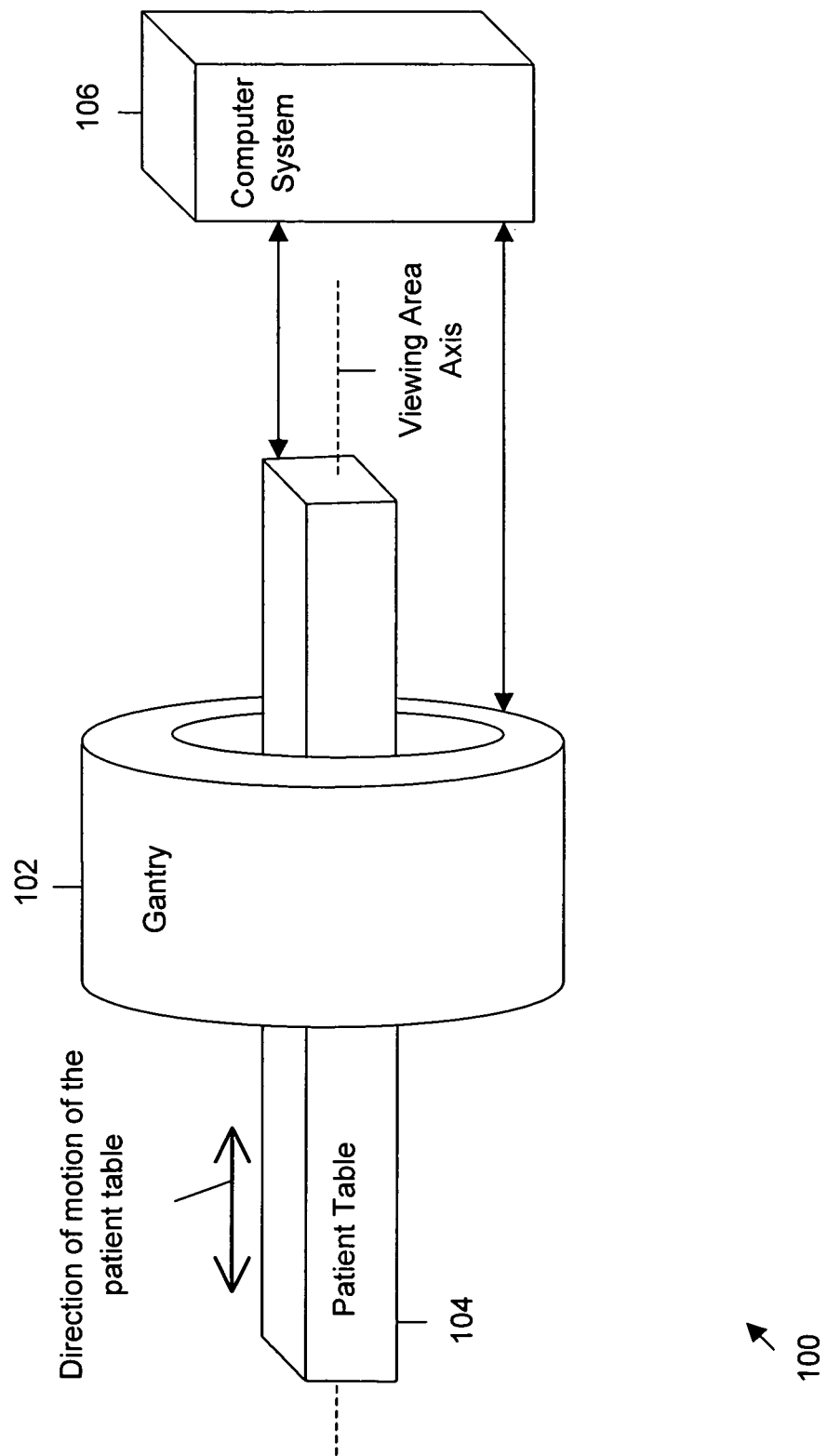
FIG. 1 is a block diagram of a medical imaging system in accordance with an exemplary embodiment of the invention.

FIG. 1 is a block diagram of a medical imaging system in accordance with an exemplary embodiment of the invention. A medical imaging system 100 such as, for example, a Positron Emission Tomography (PET) system includes a gantry 102, a patient table 104 and a computer system 106. Gantry 102 provides mechanical support for mounting devices such as, for example, detectors, scanners and transmitters that are useful for scanning a patient. Gantry 102 houses imaging devices such as, for example, PET detectors. In accordance with an embodiment of the invention, a set of detectors such as, for example, PET detectors may be located on opposite sides of gantry 102. The PET detectors are then able to acquire data by scanning the patient. The patient to be scanned lies on a patient table 104.

The imaging devices on gantry 102 acquires data by scanning a patient lying on patient table 104. Moving patient table 104 enables the scanning of various parts of the patient. Directions of the motion of patient table 104 are as shown in FIG. 1. Patient table 104 lies along the axis of gantry 102, which is known as a viewing area axis (as shown in FIG. 1) and can be moved along this viewing area axis. Patient table 104 can be positioned at various axial positions along the viewing area axis. In an embodiment of the invention, gantry 102 includes a plurality of detectors that are fixedly spaced on gantry 102 positioned radially outward from the viewing area axis. In accordance with an embodiment of the invention, gantry 102 includes a plurality of detectors that are rotatable about the viewing area axis. This enables the scanning of various parts of the patient at different axial positions.

In an embodiment of the invention, computer system 106 handles the control, for example, the positioning of patient table 104. Specifically, computer system 106 is programmed to position patient table 104 at a plurality of axial positions along the viewing area axis. This positioning enables the scanning of different axial positions of the patient. Computer system 106 may further be programmed to keep a track of the position of patient table 104. Computer system 106 is also programmed to receive acquired data collected during scanning. The signal-to-noise ratio (SNR) of the collected data is also determined by computer system 106. Based on the SNR, computer system 106 is programmed to control the scanning. For example, computer system 106 may control the termination of a scan based on the SNR. In accordance with various embodiments of the invention, computer system 106 includes a Linux PC for user interface and custom array processor boards for image reconstruction.

A scan time may also be fixed or predetermined, for example, by a user or computer system 106. In case the user fixes the scan time, computer system 106 may receive an indication of the scan time. This may help computer system 106 to control the scanning. In addition to providing the scan time, the user may also provide computer system 106 an indication of the location of a volume of interest. The volume of interest is that part of the patient which is to be scanned. The volume of interest may be selected by a user and input to computer system 106.

In addition, medical imaging system 100 may include a transmission source. The transmission source is located such that the signals transmitted by the transmission source pass through the volume of interest of the patient. The signals may get attenuated when they pass through the patient. Hence, the detectors may collect data that is attenuated as data is collected after the transmitted signals pass through the patient. The transmission source is, thus, used to acquire attenuation data relative to the patient. In accordance with an embodiment of the invention, computer system 106 may be programmed to generate the attenuation data relative to a patient using the transmission source. Computer system 106 may further be programmed to determine the scan time for a frame of acquired data based on the attenuation data Each frame of acquired data is a part of acquired data that corresponds to an axial position of patient. Moving patient table 104 along the viewing area axis enables the scanning of different axial positions of the patient. The positioning of patient table 104 is controlled by computer system 106.

The attenuation data is received by computer system 106. Computer system 106 may use the received attenuation data, for example, to determine the scan time for each frame of acquired data. Further, scan time of short scans may be determined based on the scan time determined for each frame of acquired data. The process of scanning with the help of short scans is described in detail with reference to FIG. 4.

Figure 2:
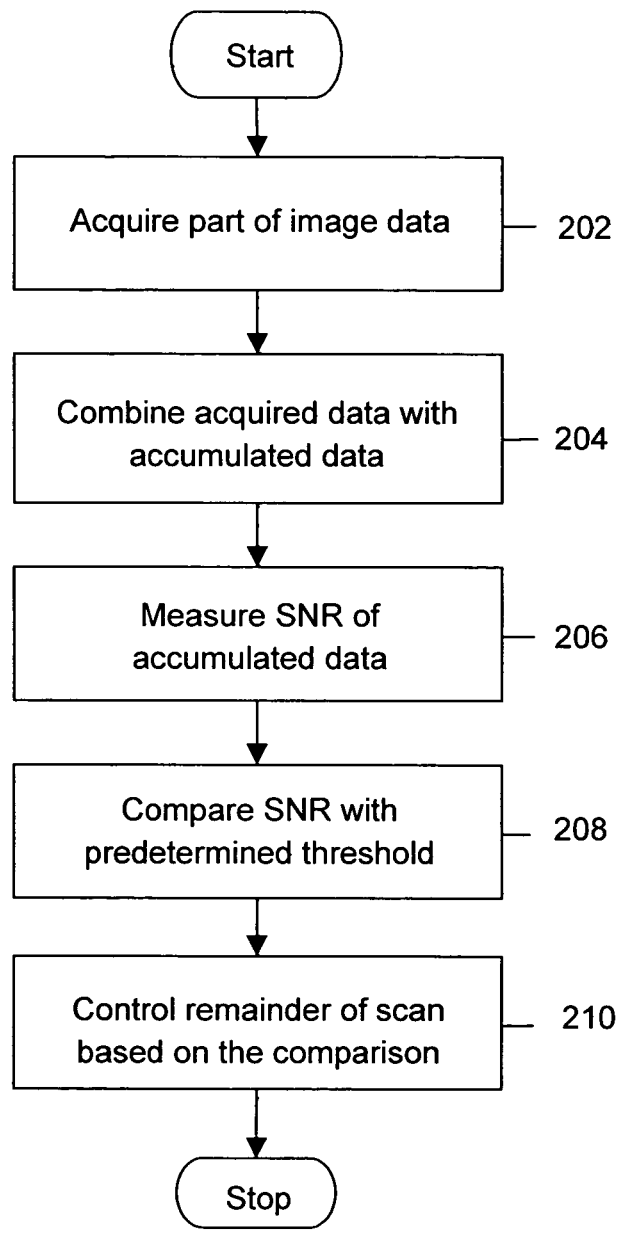
FIG. 2 is a flowchart showing the steps to control a scan in accordance with an exemplary embodiment of the invention.

FIG. 2 is a flowchart showing the steps involved in the scanning of a patient in accordance with an exemplary embodiment of the invention. The patient to be scanned lies on patient table 104. The detectors such as, for example, PET detectors mounted on gantry 102 are used for scanning. The detectors may scan only the volume of interest. At step 202, part of the acquired data is acquired by scanning. In accordance with an embodiment of the invention, the acquired data corresponds to the complete volume of interest. In accordance with another embodiment of the invention, the acquired data corresponds to a portion of the volume of interest such as, for example, a frame of acquired data. Computer system 106 (as shown in FIG. 1) receives the acquired data. At step 204, the acquired data is combined with accumulated data by computer system 106. Accumulated data is data accumulated over earlier scan cycles. The acquired data for each frame of acquired data is combined with the accumulated data corresponding to that frame of acquired data. The combined data forms the accumulated data for any further processing.

At step 206, computer system 106 determines the SNR of the accumulated data. In accordance with various embodiments a Poisson distribution is assumed. Therefore, the SNR may be measured by measuring the activity. Median value of the activity for the acquired sinograms gives a measure of the SNR. This value may also include the measure of the SNR in the air surrounding the patient. Hence, in order to determine the SNR of the patient, a lower threshold may be applied to limit data to inside the body. For example, SNR=$\sqrt{}$(median (Acquired sinogram points>lower threshold)). In accordance with various embodiments of the invention, the attenuation data may also be utilized to limit the data used for median calculation to inside the patient. This may be achieved by edge thresholding the attenuation data to identify the edges of the body. The edges of the body can be identified by comparing the attenuation data to a threshold value. At the edges of the body the attenuation data exceeds the threshold value.

In accordance with an embodiment of the invention, the determined SNR corresponds to the accumulated data for the entire volume of interest. In accordance with another embodiment of the invention, the SNR may be determined for different parts of the volume of interest such as, for example, for acquired data corresponding to the axial positions of patient table 104 (as shown in FIG. 1). At step 208, computer system 106 (as shown in FIG. 1) compares the value of SNR with a selectable threshold. In accordance with an embodiment of the invention, the user may set the threshold for the scan. This selected threshold may be a predetermined threshold value or it may depend on the relative change in the value of SNR during the scan. At step 210, computer system 106 controls remainder of the scan based on the comparison between the determined SNR and the selected threshold. The control of the remainder of the scan may include, for example, terminating part of the scan or the complete scan, or scanning for acquiring more acquired data corresponding to a particular position of patient table 104.

Figure 3A:
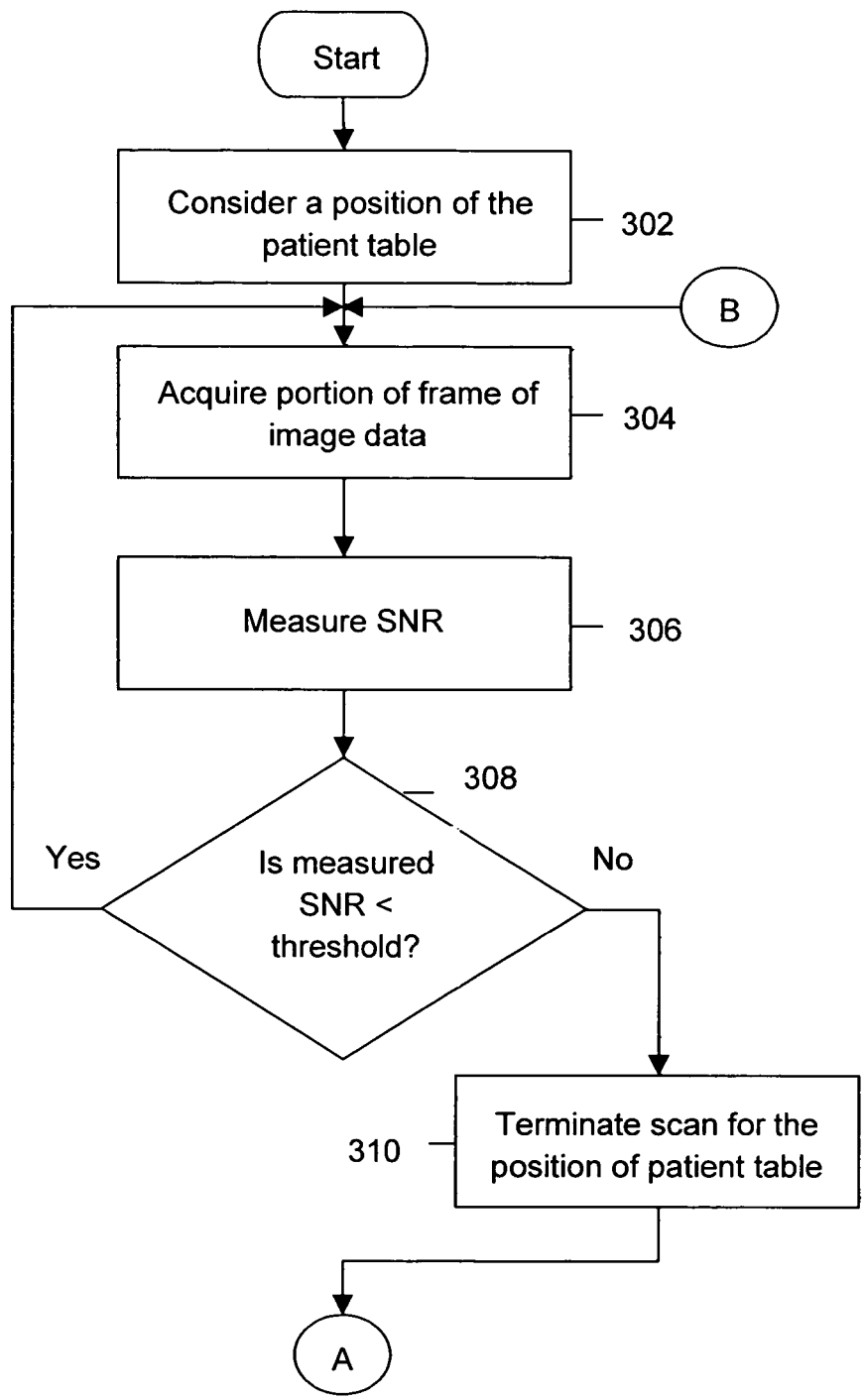
FIGS. 3A and 3B are a flowchart showing the steps to terminate a scan in accordance with an exemplary embodiment of the invention.
Figure 3B:
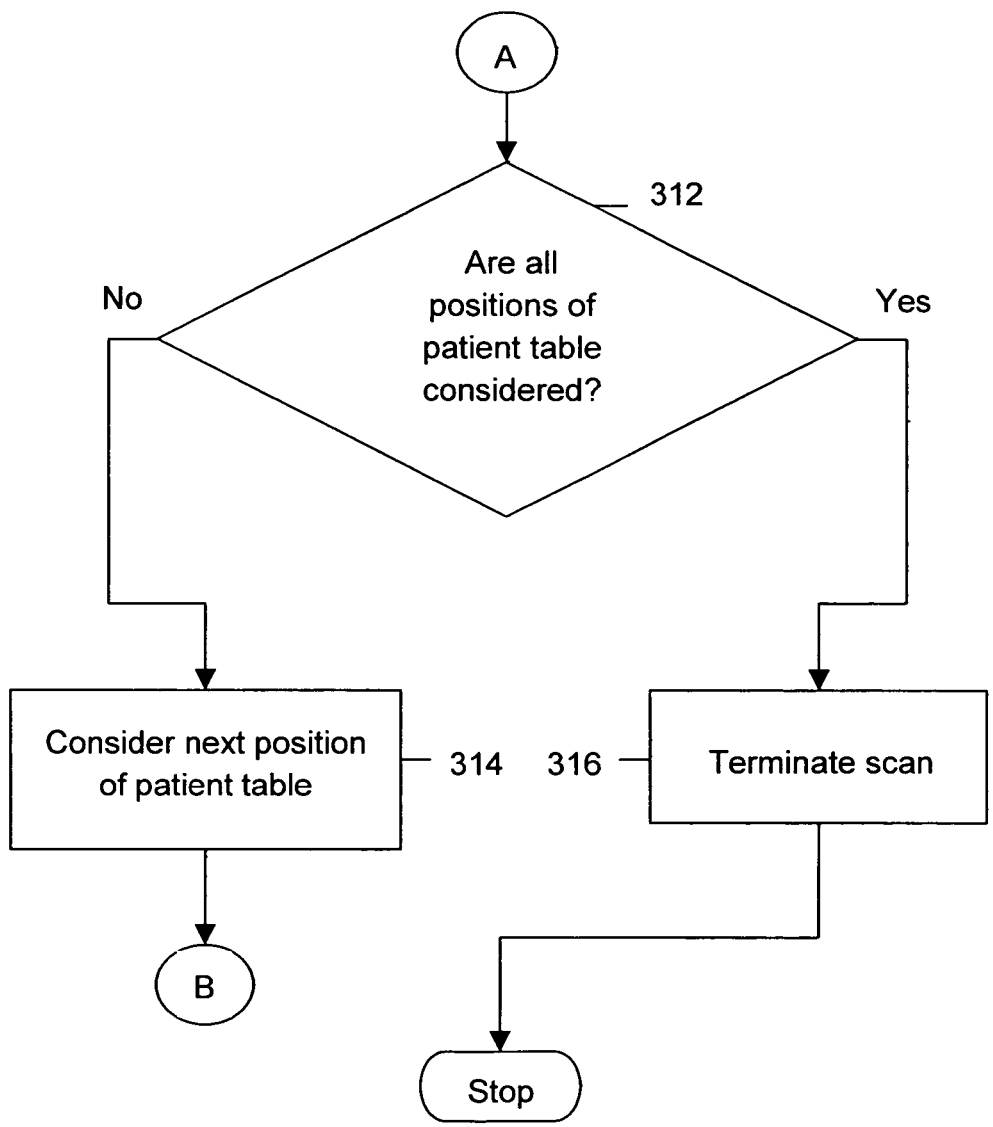

FIGS. 3A and 3B are a flowchart showing the steps to terminate the scan in accordance with an exemplary embodiment of the invention. At step 302, a first axial position of patient table 104 is considered. Computer system 106 (as shown in FIG. 1) positions patient table 104 (as shown in FIG. 1), along different positions on the viewing area axis, in order to enable scans of different axial positions of the patient. The scan is initiated for this position. At step 304, at least a portion of a frame of the acquired data is acquired. The entire acquired data of a frame of acquired data is not acquired at once. Every activity detected forms a portion of a frame of the acquired data. At this step the first position is scanned to acquire the corresponding acquired data. The acquired data is accumulated over a number of scans performed for the position. At step 306, the SNR of the accumulated data is measured. At step 308, the measured SNR is compared with a threshold, which may be predetermined. If the measured SNR is less than the threshold, then the acquired data may not give a desired image quality, as there may be more than acceptable noise in the acquired data In such a scenario, the scan for the position is not complete and therefore, step 304 and step 306 are repeated.

If at step 308 it is found that the measured SNR is greater than or equal to the threshold, then it means that the accumulated data includes acceptable noise in it and step 310 is performed. At step 310, the scan for that particular position is terminated. This means, the scan for that particular position is complete if the determined SNR for the corresponding acquired data is greater than or equal to the threshold. At step 312, it is checked if all axial positions of patient table 104 (as shown in FIG. 1) for which scanning is to be performed have been considered, i.e. each position corresponding to the volume of interest has been scanned and the scan for each position is complete.

If at step 312 it is found that all positions have not been considered for scanning, then step 314 is performed. At step 314, the next position is taken into consideration. Following this the steps from step 304 to step 312 are repeated. However, if at step 312, it is found that all the positions have been considered, then the scanning is complete, and step 316 is performed. At step 306, the scanning is terminated.

In an embodiment of the invention, computer system 106 may be programmed to execute the steps shown in FIGS. 3A and 3B.

In accordance with various embodiments of the invention, the scanning of a patient is performed with the help of a number of short scans. During each short scan at least a portion of acquired data for a frame of acquired data, within the volume of interest, is acquired. In accordance with various embodiments of the invention, each short scan in a PET system is performed such as, for example, by scanning for a fixed time or till a fixed activity is detected. The detected activity in PET systems corresponds to the number of gamma rays detected by the PET scanners. In accordance with an embodiment of the invention, a set of short scans is performed to cover the entire volume of interest. Accordingly, such sets may be acquired till the SNR of the accumulated data is greater than or equal to the threshold. In accordance with an embodiment of the invention, the SNR for only the frames of acquired data that are included in a selectable volume of interest is measured. The user, based on data acquired by performing a quick scan, may select the selectable volume of interest. The selection may be defined based on, for example, frame numbers. In accordance with various embodiments of the invention, the user selects a selectable volume of interest, which is used for the termination of the scan. For example, the scan is terminated based on the SNR of the selected volume, i.e. the termination of the scan may be based on a specific anatomy.

Figure 4:
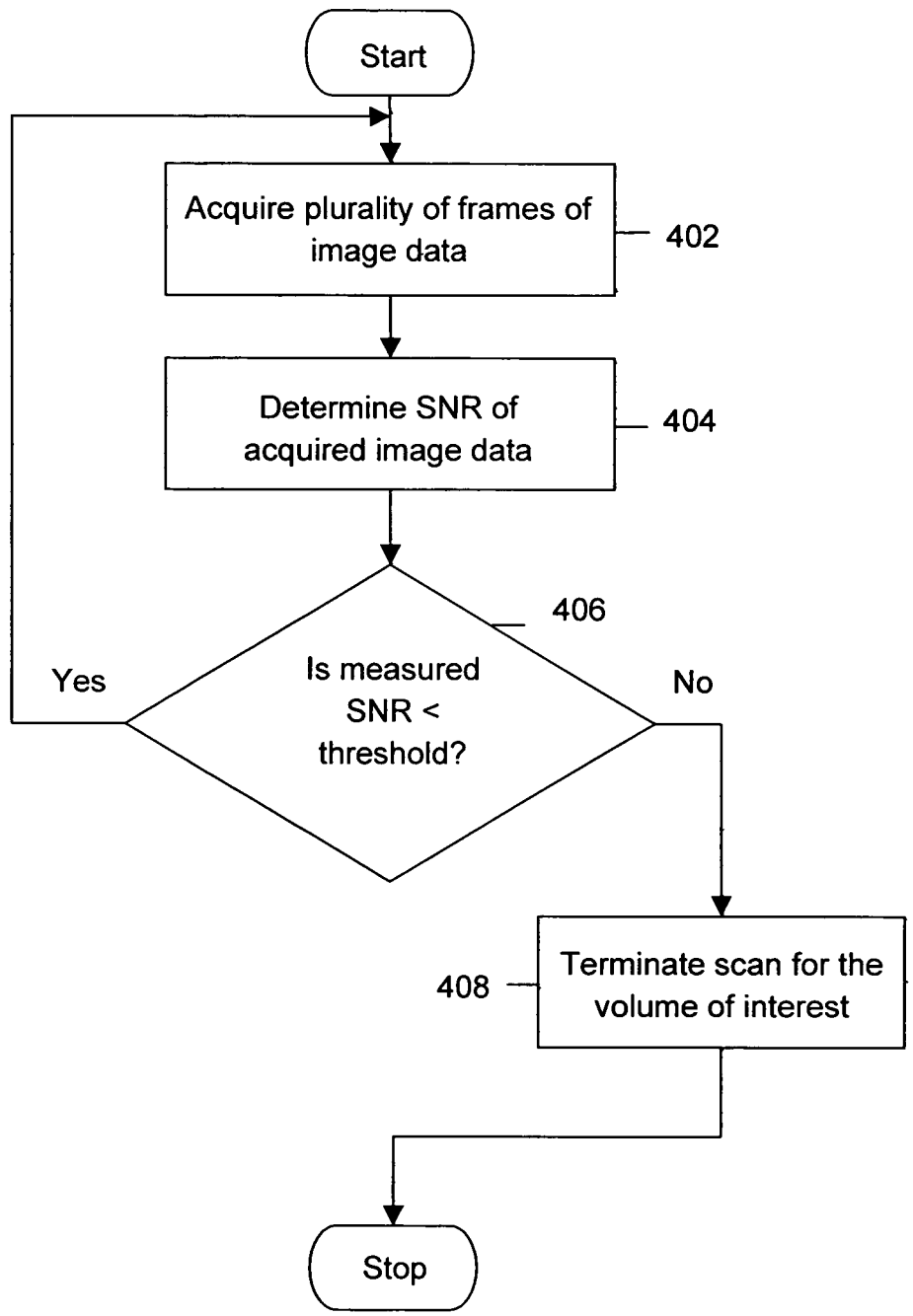
FIG. 4 is a flowchart depicting the steps to scan a patient in accordance with an exemplary embodiment of the invention.

FIG. 4 is a flowchart depicting the steps for scanning a patient in accordance with an exemplary embodiment of the invention. At step 402, acquired data with the help of a plurality of short scans corresponding to the frames of acquired data is acquired. Each of the frames of acquired data corresponds to a different axial position of the patient. The scanning at various axial positions is performed such as, for example, by moving patient table 104 (as shown in FIG. 1), on which the patient lies, along the viewing area axis.

At step 404, the SNR of the collected acquired data is determined. In accordance with an embodiment of the invention, the SNR is calculated for the entire data collected across various axial positions. In accordance with another embodiment of the invention, the SNR may be calculated separately for acquired data collected corresponding to each individual frame of acquired data.

At step 406, the determined SNR is compared with a selected threshold. If at step 406, it is found that the determined SNR is less than the selected threshold, then the steps from step 402 to step 406 are repeated. However, if at step 406, it is found that the determined SNR is greater than or equal to the selected threshold, then step 408 is performed. At step 408, the scan is terminated. In accordance with an embodiment, where the compared SNR corresponds to the entire volume of interest, the entire scanning of the volume of interest is complete. The scan is, hence, terminated. In accordance with another embodiment, where the compared SNR corresponds to part of the volume of interest such as, for example, each individual frame of acquired data, the scanning only for that part of the volume of interest is complete. Hence, scanning for the parts corresponding to the frames of acquired data for which the SNR is greater or equal to the threshold is terminated. Scanning of other parts corresponding to other axial positions for which SNR was found to be less than the threshold is continued. This scanning is performed by skipping the scanning of parts of the volume of interest for which the scanning is complete.

In an embodiment of the invention, computer system 106 is programmed to execute the steps shown in FIG. 4.

In accordance with various embodiments of the invention, the selectable SNR threshold corresponds to the difference in the determined SNR of two consecutive scans. Therefore, in accordance with these various embodiments, the difference in the determined SNR of two consecutive scans is compared with the selected threshold. When this difference is below or equal to the selected threshold, the acquired data may be assumed to be converging and stable. Therefore, if the difference is below the selected threshold, then the scan is complete. The scan will then be terminated based on the methods described earlier.

In accordance with various embodiments of the invention, the SNR is determined for acquired data. In accordance with various other embodiments of the invention, the SNR is determined for the reconstructed image or the SNR may be determined for both the acquired data and the reconstructed image.

In accordance with various embodiments of the invention, the scanning process involves determining a scan time for each frame of acquired data. The short scans performed for each frame of acquired data may have a predetermined scan time which is substantially shorter than the determined scan time for each frame of acquired data. The scan time may be determined, for example, based on the attenuation data acquired for each frame of acquired data. The acquired attenuation data, for example, provides an indication of the density of the body portion that corresponds to a frame of acquired data. Based on the density of the body portion the amount of allowable noise may be decided. For example, a larger amount of noise may be allowable for a denser portion. Correspondingly, the selectable SNR threshold may be lower for the corresponding frame of acquired data. Therefore, the attenuation data or the density of a portion of the patient's body may be used to automatically determine the SNR value at which to terminate the scan.

In accordance with various embodiments of the invention, the scan time for the scan of the complete volume of interest may be fixed. The embodiments allow more scan time for some positions of patient table 104 and shorten the scan time for others. Shortening the scan time for some positions may be feasible provided that the predicted image quality corresponding to the positions, based on their SNR, is as desired, even for a short scan time. This provides more time to focus the scanning on some positions, which may be beneficial to get an image of consistent quality. Further, scheduling of scans is easier because the scan time is fixed.

A technical effect of various embodiments of the invention is optimization of the scan time for the scan of the complete volume of interest or for each position of patient table 104.

Another technical effect of various embodiments of the invention is the shortening of scan time. This is possible as only the necessary amount of time is spent on the scanning. Shortening the required scan time may increase productivity. The reduced scan time also provides an increased comfort to the patient. Reducing scan time may also reduce motion and the metabolic artifacts that may otherwise adversely affect the image.

Another technical effect of various embodiments of the invention is to enable a user to predict the image quality. As the user may set the threshold for the SNR, the user may predict and control the image quality. This further allows the user to increase the image quality.

While the invention has been described in terms of various specific embodiments, those skilled in the art will recognize that the invention can be practiced with modification within the spirit and scope of the claims.

What is claimed is:

1. A method of imaging a patient, said method comprising:
   acquiring a plurality of frames of acquired data of the patient wherein each frame of acquired data is acquired at a different position along a longitudinal axis of the patient;
   determining a length of scan time for each frame;
   acquiring a short scan for each frame wherein the short scan is a scan of a predetermined time length, the predetermined time length to be substantially shorter than the determined length of scan time for each frame;
   measuring a signal-to-noise ratio of the acquired data in frames that include a selectable volume of interest;

comparing the measured signal-to-noise ratio to a selected signal-to-noise ratio threshold; and acquiring additional acquired data in frames that include the selected volume of interest until the measured signal-to-noise ratio is greater than or equal to the selected signal-to-noise ratio threshold.

2. A method of imaging a patient in accordance with claim 1 wherein determining a length of scan time for each frame comprises:

acquiring attenuation data for each frame of the plurality of frames; and determining the length of scan time for each frame using the attenuation data.

3. A method in accordance with claim 1 wherein comparing the measured signal-to-noise ratio to a selectable signal-to-noise ratio threshold comprises selecting a signal-to-noise ratio threshold using a relative change of the signal-noise-ratio during the scan.

4. A method in accordance with claim 1 wherein comparing the measured signal-to-noise ratio to a selectable signal-to-noise ratio threshold comprises selecting a predetermined signal-to-noise ratio threshold value.

5. A method in accordance with claim 1 further comprising:

acquiring at least a portion of a frame of acquired data of a volume of interest; and combining the acquired data with an accumulated total acquired data.

6. A method in accordance with claim 1 wherein controlling a remainder of the scan using the comparison comprises terminating the scan if the measured signal-to-noise ratio is greater than or equal to the selected signal-to-noise ratio threshold.

7. A method in accordance with claim 1 wherein controlling a remainder of the scan using the comparison comprises acquiring an additional portion of a frame of acquired data until the measured signal-to-noise ratio is greater than or equal to the selected signal-to-noise ratio threshold.

* * * * *